Patented Jan. 18, 1938

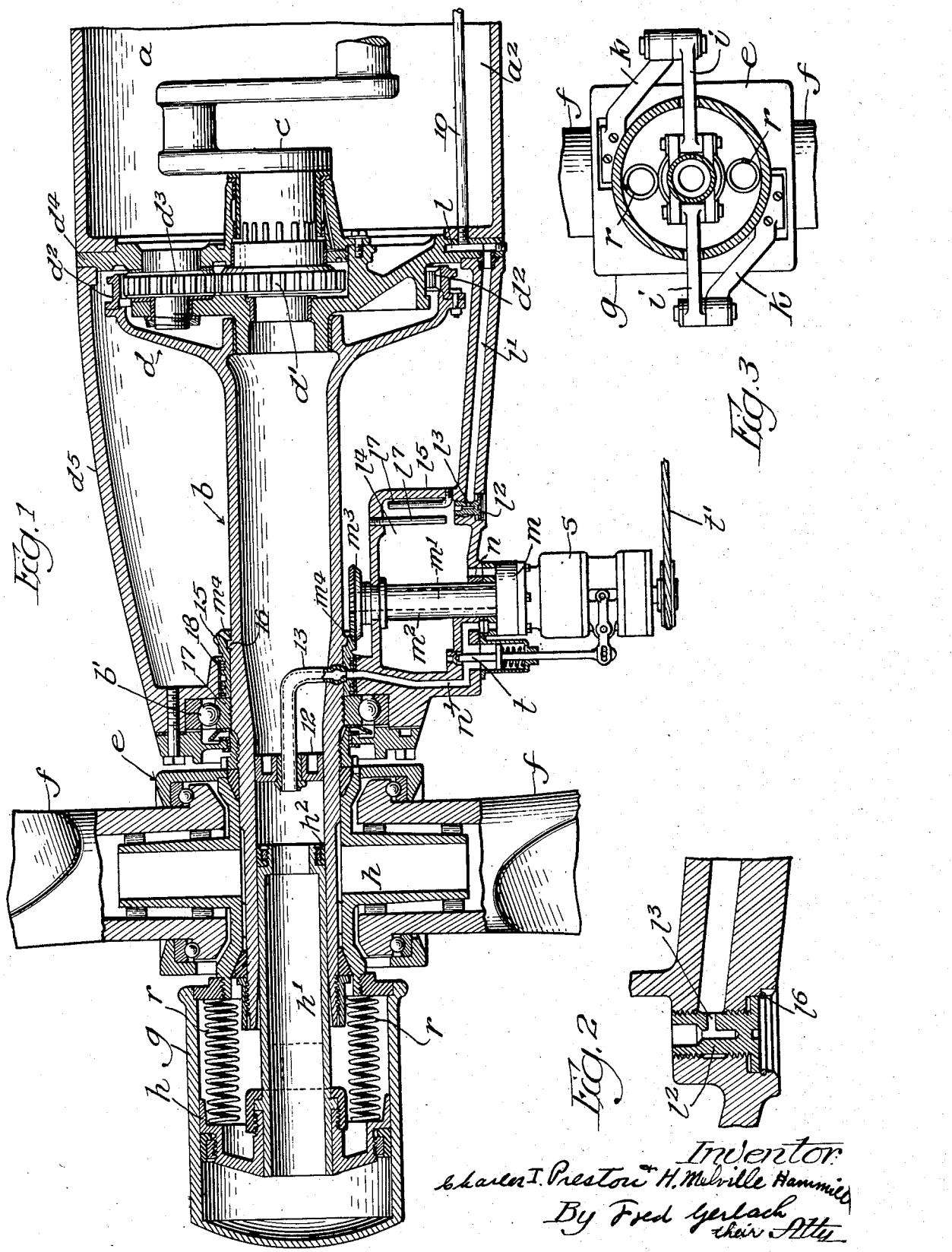

2,105,843

UNITED STATES PATENT OFFICE 2,105,843

CONTROLLABLE PITCH PROPELLER

Charles I. Preston and Harry Melville Hammill, Williamsport, Pa., assignors to Aviation Manufacturing Corporation, Chicago, Ill., a corporation of Delaware Application November 29, 1935, Serial No. 52,151

8 Claims. (Cl. 170—163)

The invention relates to hydraulic mechanism for controllable pitch propellers.

In aircraft, it is now common practice to use lubricating-oil from the internal combustion engine which drives the propeller to operate hydraulic means for changing the pitch of the propeller-blades. Heretofore, it has been customary to freely pump lubricating-oil from the engine to the hydraulic means. This frequently, in the event of a substantial leak or breakage in the pitch-change mechanism, resulted in reducing the pressure and volume of oil in the lubrication-system of the engine and, in some instances, below that required for proper lubrication sufficiently to cause engine failure or damage.

The object of the invention is to provide improved hydraulic mechanism for controllable pitch propeller-blades, in which oil from the engine, which drives the propeller, is used for operating said mechanism, and in which provision is made for limiting the volume of lubricating-oil which can be taken from the engine for the operation of the pitch-varying mechanism. By providing in the line for the oil from the engine to the hydraulic mechanism a limited rate of flow the engine, notwithstanding any breakage of, or substantial loss in, oil in the hydraulic mechanism, will not interfere with the lubrication of the engine. The maximum rate of flow of the oil to said mechanism is limited so that lubricating-oil pressure in the engine will never be reduced to such an extent as to interfere with the efficient lubrication of the engine or to cause failure from lack of lubrication. The maximum rate of flow may be so low that the amount of oil normally added to the engine will compensate for that used in the hydraulic mechanism even if loss of the oil should be permitted by the latter.

This object is attained primarily by providing between the pressure oil line and the hydraulic mechanism for adjusting the pitch of the propeller-blades, a restricting device or nozzle which limits the rate of flow of the oil to said mechanism, so that the drop in volume at the maximum flow will not interfere with the proper lubrication of the engine and also by providing, between the flow-restricting device and the hydraulic pressure mechanism, an accumulating chamber of limited capacity so that the pump for supplying the lubricant to the fluid pressure mechanism may deliver sufficient oil to operate said mechanism but no more than the accumulated volume in said chamber resulting from the flow-restricting device.

Other objects of the invention will appear from the detailed description.

The invention consists in the several novel features hereinafter set forth and more particularly defined by claims at the conclusion thereof.

In the drawing:

Fig. 1 is a central longitudinal section through a portion of the internal combustion engine and an aircraft propeller to which the invention is applied. Fig. 2 is an enlarged section illustrating the device for restricting the rate of flow of lubricating oil from the engine to the accumulating chamber from which oil is delivered to the hydraulic mechanism. Fig. 3 is a view of the devices connecting the fluid pressure operated piston and the propeller-blades for pitch adjustment.

The invention is exemplified in a structure comprising an internal combustion engine $a$, a propeller shaft $b$ driven from the crank-shaft $c$ of the engine through suitable reduction gearing $d$, a housing $d^5$ which encloses the reduction-gearing and is adapted to retain lubricating-oil, a propeller hub $e$, in which propeller-blades $f$ are rotatably mounted for pitch variation and hydraulic mechanism for shifting the blades for pitch variation which comprises a fluid-cylinder $g$ fixedly mounted on the front end of the hub $e$, a piston $h$ in said cylinder, movable in one direction by the fluid under pressure, links $i$ pivotally connected to the piston and connected, respectively, to arms $k$ on the shanks of the propeller-blades, and springs $r$ for retracting the piston $h$ when permitted by the reduction of fluid pressure in the cylinder $g$. The reduction gearing $d$ comprises a gear $d^1$ which is connected to rotate with the crank-shaft $c$, an internally toothed ring-gear $d^2$ fixed to the propeller shaft $b$ and intermediate pinions $d^3$ which are journaled in a head $d^4$ mounted between the engine-casing and the housing $d^5$ for the reduction-gearing. The housing $d^5$ carries at its front end a bearing $b^1$ for the propeller shaft. The engine is equipped with the usual pump (not shown) and lines for circulating lubricating oil under pressure from a suitable well or oil-sump, usually in the bottom of the crank-case $a^2$, to all the parts of the engine and auxiliary equipment which require lubrication, as well understood in the art. The mechanism thus far described may be of any suitable type or construction known in the art.

Oil from the engine is used for operating the piston $h$ to vary the pitch of the propeller blades $f$. For this purpose the piston $h$ is provided with a hollow stem $h'$, which is slidable in the shaft $b$ and provided with a packing-ring $h^2$ at its inner end to form a fluid-tight fit between the bore of the propeller shaft and the hollow stem of the piston. A head $12$ is fixed in the shaft $b$, inwardly of the piston-stem $h'$, and an oil-delivery pipe $13$ having its ends fixed in head $12$ and shaft $b$, is adapted to deliver oil from an annular channel in a ring $15$, which is fixed to rotate with the propeller shaft $b$, and is provided with piston-rings $18$ to prevent escape of oil through the bearing $b'$ for the shaft. Oil forced to the oil-ring $15$ passes through pipe $13$, the propeller-shaft $b$ in front of the head $12$, and the hollow stem $h'$ of the piston $h$ to react on the outer end of the piston and operate the links $i$ for rotating the propeller-blades $f$ on their own axes to increase the pitch of the blades. In this type of propeller, the increase of oil pressure in the cylinder $g$ operates the blade-shifting mechanism to reduce the pitch and, upon decrease of pressure, the counter force serves to increase the pitch of the blades. This exemplifies hydraulic mechanism operable by oil under pressure for shifting the propeller-blades to vary their pitch.

The lubricant lines comprise a pipe $10$ for delivering oil under pressure from the oil-pump for the engine into a passage $l$ in the head $d^4$, from which it flows to a forwardly leading duct $l'$ in the housing $d^5$ to a flow-restricting device for limiting the rate of flow from the pump to the hydraulic pitch-controlling mechanism. This device consists of a nozzle $l^2$, which is screwed into the housing $d^5$ and has a small or restricted orifice $l^3$ which limits the rate of flow of oil from the engine to an accumulating chamber $l^4$, into which this nozzle discharges the oil. This chamber is formed by a partition-wall $l^5$ in and integral with the housing $d^5$ and is adapted to contain a limited quantity of oil, such for example as a quart, or approximately a sufficient quantity for the operation of the hydraulic mechanism. This partition separates the chamber $l^4$ from the chamber in the housing which contains the lubricant for the reducing gearing. Overflow and vent pipes $l^7$ are provided to permit the excess oil which may accumulate in chamber $l^4$ to flow back into the housing $d^5$ from which it will flow back into the oil well in the motor.

An important attribute of the flow-restricting nozzle $l^2$ and the chamber $l^4$ for retaining a limited supply of oil for use in the hydraulic mechanism, is that the maximum rate of flow of oil from the oil-pump for the engine is reduced to such an extent that the flow of oil to the chamber $l^4$ for use in the hydraulic mechanism, will be insufficient at all times to interfere with the normal pressure of oil required for lubrication of the engine and the auxiliary parts. The chamber $l^4$ permits a limited quantity of oil to accumulate from the flow-restricting nozzle for the operation of the hydraulic mechanism. The rate of flow into chamber $l^4$ is far below the capacity of pump $m$. As a result, the pump cannot, at any time, draw oil from the engine at a greater rate of flow than that permitted by the nozzle $l^2$. Should the chamber $l^4$ be drained by the pump, no additional oil can be delivered to the cylinder $g$, by pump $m$ except the small quantity permitted to enter said chamber through nozzle $l^2$. The maximum rate of flow through this nozzle is so low that in the event of the loss of the oil from the hydraulic mechanism, on account of breakage or leak, the amount of oil taken from the oil supply in the engine will always be insufficient to reduce the pressure sufficiently to interfere with the proper and normal lubrication of the engine and its auxiliaries. The nozzle $l^2$ is in the form of a screw-plug which can be threaded from below into the lower portion of the bottom-wall of chamber $l^4$, so that it can be readily removed for cleaning purposes. This plug is locked in place by a split-ring $l^6$.

A pump $m$ is provided for forcing oil under pressure to the cylinder $g$ for operating piston $h$. This pump is driven by a vertical shaft $m'$ which is journaled in a sleeve $m^2$ which extends vertically through the chamber $l^4$. A gear $m^4$, which is integral with ring $15$, is secured to rotate with the propeller-shaft and drives a bevelled gear $m^3$ fixed to the upper end of shaft $m'$ to drive the pump $m$. A duct $n$ leads from oil-chamber $l^4$ to the intake of the pump. A duct $n'$ leads from the discharge side of the pump to ring $15$. From ring $15$, the oil is forced through pipe $13$, propeller-shaft $b$ and piston-stem $h'$ to the cylinder $g$.

A speed-controlled governor $s$, preferably of the fly-ball type, as well understood in the art, is driven by the pump-shaft $m'$ to operate a pressure regulating valve $t$, which permits some of the oil from the hydraulic cylinder $g$ to flow into the oil compartment $l^4$. A cable $t'$ is usually connected to the governor, so that the regulating valve $t$ may also be manually controlled.

During the operation of the propeller-shaft, the oil-pump of the engine will force oil through pipe $10$, duct $l'$, and nozzle $l^2$ into the oil compartment $l^4$. The pump $m$ will be driven from the propeller-shaft at a speed proportionate to the propeller and engine speed and draw oil from the contents of chamber $l^4$ through intake duct $n$ and force it through the discharge duct $n'$, ring $15$, pipe $13$ and piston-stem $h'$, into the outer end of the cylinder $g$. The pressure of the oil will be governed by the valve $t$ under control of the speed-controlled governor $s$, and the manual control cable $t'$ to control the pressure in the cylinder $g$ and the corresponding pitch-changes effected by the movement of the piston $h$ in said cylinder.

The oil delivered to chamber $l^4$, from which the pump $m$ takes its supply, enters said chamber through ducts $l$, $l'$ and nozzle $l^2$, which is provided with the restricted orifice $l^3$, to limit the rate of flow from the oil sump or well $a^2$ of the engine to the chamber $l^4$. As a result, the volume of oil taken from the oil-well or sump of the engine for use in the hydraulic pitch-change mechanism will be limited to prevent substantial reduction of pressure in the oiling system of the engine.

In practice, leaks or breakage occasionally occur in the hydraulic mechanism and if the booster-pump for forcing oil from the engine to said mechanism continues to operate under such conditions, the pressure of oil in the engine will be quickly reduced, which results in engine failure or injury due to inadequate lubricant.

With the present invention, the maximum rate of flow of oil through the nozzle $l^2$ to the chamber $l^4$ for use in the hydraulic pitch-change mechanism, is so low that it is impossible to bleed the oil supply in the engine. As a result, it becomes impossible to deplete the supply of oil in the lubricating system of the engine by the hydraulic pitch-change mechanism.

The invention exemplifies hydraulic pitch-change mechanism for propellers in which oil under pressure for operating said mechanism is derived from the supply of lubricating-oil for the engine and in which the rate of flow of the oil from the engine is restricted to prevent reduction of pressure of lubricating-oil in the engine or from reducing it sufficiently to cause insufficient or inefficient lubrication of the engine and its associated parts.

The invention is not to be understood as restricted to the details set forth, since these may be modified within the scope of the appended claims, without departing from the spirit and scope of the invention.

Having thus described the invention, what we claim as new and desire to secure by Letters Patent is:

1. The combination with a variable pitch propeller provided with hydraulic means for varying the pitch of the propeller blades, of means for delivering lubricating oil under pressure from the engine-lubricating system, comprising a constantly open device for restraining the rate of flow of oil from the engine sufficiently to prevent substantial reduction of the oil pressure in the lubricating system to less than that required for proper lubrication of the engine, means for accumulating a sufficient quantity of oil from the flow-restricting device to operate the pitch-change means, and means for delivering oil from the accumulating means to the hydraulic pitch-changing means.

2. The combination with a variable pitch propeller provided with hydraulic means for varying the pitch of the propeller blades, of means for delivering lubricating oil under pressure from the engine-lubricating system, comprising a constantly open nozzle with an orifice for restricting the rate of flow of oil from the engine sufficiently to prevent substantial reduction of the oil pressure in the lubricating system to less than that required for proper lubrication of the engine, means for accumulating a sufficient quantity of oil from the flow-restricting device to operate the pitch-change device, and controllable means for delivering oil from the accumulating means to the hydraulic pitch-changing means.

3. The combination with a variable pitch propeller provided with hydraulic means for varying the pitch of the propeller blades, of means for delivering lubricating oil under pressure from the engine-lubricating system, comprising a constantly open device for restricting the rate of flow of oil from the engine sufficiently to prevent substantial reduction of the oil pressure in the lubricating system to less than that required for proper lubrication of the engine, means for accumulating a sufficient quantity of oil from the flow-restricting device to operate the pitch-change means, a pump driven from the propeller for forcing oil from the accumulating means to the hydraulic pitch-changing means, and means for controlling the delivery of oil to the pitch-changing means to shift the blades.

4. The combination with a variable pitch propeller provided with hydraulic means for varying the pitch of the propeller blades, of means for delivering lubricating oil under pressure from the engine-lubricating system, comprising a removable plug having a constantly open orifice for restricting the rate of flow of oil from the engine sufficiently to prevent substantial reduction of the oil pressure in the lubricating system to less than that required for proper lubrication of the engine, means for accumulating a sufficient quantity of oil from the flow-restricting device to operate the pitch-change means, and controllable means for delivering oil from the accumulating device to the hydraulic pitch-changing means.

5. The combination with a variable pitch propeller, provided with hydraulic means for varying the pitch of the propeller blades, of a housing through which the shaft of the propeller extends, a chamber in the housing for accumulating a sufficient quantity of oil to operate the pitch-changing means, means for delivering oil under pressure from the engine-lubricating system to the chamber, comprising a constantly open device for restricting the rate of flow of oil from the engine sufficiently to prevent substantial reduction of the oil pressure in the lubricating system to less than that required for proper lubrication of the engine, and controllable means for delivering oil from the accumulating chamber to the hydraulic pitch-changing means.

6. The combination with a variable pitch propeller, provided with hydraulic means for varying the pitch of the propeller blades, of a housing through which the shaft of the propeller extends, a chamber in the housing for accumulating a sufficient quantity of oil to operate the pitch-change means, means for delivering oil under pressure from the engine-lubricating system to the chamber, comprising a plug in, and removable from the outside of, the housing, having a constantly open orifice for restricting the rate of flow of oil from the engine sufficiently to prevent substantial reduction of the oil pressure in the lubricating system to less than that required for proper lubrication of the engine, and controllable means for delivering oil from the accumulating chamber to the hydraulic pitch-changing means.

7. The combination with a variable pitch propeller, provided with hydraulic means for varying the pitch of the propeller blades, of a housing through which the shaft of the propeller extends, a chamber in the housing for accumulating a sufficient quantity of oil to operate the pitch-change means, means for delivering oil under pressure from the engine-lubricating system to the chamber, comprising a duct in the housing and a removable plug in the housing, having a constantly open orifice for restricting the rate of flow of oil from the engine sufficiently to prevent substantial reduction of the oil pressure in the lubricating system to less than that required for proper lubrication of the engine, and controllable means for delivering oil from the accumulating chamber to the hydraulic pitch-changing means.

8. The combination with a variable pitch propeller, provided with hydraulic means for varying the pitch of the propeller blades, of a housing through which the shaft of the propeller extends, a chamber in the housing for accumulating a sufficient quantity of oil to operate the pitch-change means, means for delivering oil under pressure from the engine-lubricating system, comprising a constantly open device for restricting the rate of flow of oil from the engine sufficiently to prevent substantial reduction of the oil pressure in the lubricating system to less than that required for proper lubrication of the engine, a pump driven from the propeller shaft and connected to the housing for delivering oil from the accumulating chamber to the hydraulic pitch-changing means.

CHARLES I. PRESTON.
H. MELVILLE HAMMILL.